United States Patent
Bode et al.

(10) Patent No.: US 7,200,459 B1
(45) Date of Patent: *Apr. 3, 2007

(54) METHOD FOR DETERMINING OPTIMAL PHOTOLITHOGRAPHY OVERLAY TARGETS BASED ON PROCESS PERFORMANCE AND YIELD IN MICROELECTRONIC FABRICATION

(75) Inventors: Christopher Allen Bode, Austin, TX (US); Anthony J. Toprac, Austin, TX (US)

(73) Assignee: Advanced Micro Devices, Inc., Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 09/477,201

(22) Filed: Jan. 4, 2000

(51) Int. Cl.
*G06F 19/00* (2006.01)

(52) U.S. Cl. ...................................... 700/121; 700/110

(58) Field of Classification Search ............. 700/95, 700/108, 109, 110, 119, 120, 121; 702/84, 702/127, 150, 182; 430/22, 30; 356/394, 356/401, 237.4
See application file for complete search history.

(56) References Cited

U.S. PATENT DOCUMENTS

| | | | |
|---|---|---|---|
| 4,938,600 A * | 7/1990 | Into ............................ 356/401 |
| 5,126,028 A | 6/1992 | Hurwitt et al. ......... 204/192.13 |
| 5,408,405 A | 4/1995 | Mozumder et al. ........... 700/31 |
| 5,444,637 A * | 8/1995 | Smesny et al. ............. 702/127 |
| 5,498,500 A * | 3/1996 | Bae .............................. 430/22 |
| 5,546,312 A | 8/1996 | Mozumder et al. ........... 700/97 |
| 5,629,772 A | 5/1997 | Ausschnitt ................... 356/625 |
| 5,655,110 A | 8/1997 | Krivokapic et al. .......... 716/19 |
| 5,926,690 A | 7/1999 | Toprac et al. ................ 438/17 |
| 5,952,132 A * | 9/1999 | King et al. .................... 430/22 |
| 6,324,481 B1 * | 11/2001 | Atchison et al. .............. 702/84 |
| 6,368,884 B1 * | 4/2002 | Goodwin et al. ............. 438/14 |
| 6,440,612 B1 * | 8/2002 | Baggenstoss ................. 430/5 |
| 6,470,230 B1 * | 10/2002 | Toprac et al. ............... 700/121 |
| 6,535,774 B1 * | 3/2003 | Bode et al. ................. 700/109 |

OTHER PUBLICATIONS

Chien et al., Modeling Overlay Errors and Sampling Strategies to Improve Yield, Journal of the Chinese Instittute of Industrial Engineers, vol. 18, No. 3, pp. 95–103.*

* cited by examiner

*Primary Examiner*—Leo Picard
*Assistant Examiner*—Chad Rapp
(74) *Attorney, Agent, or Firm*—Williams, Morgan & Amerson

(57) ABSTRACT

A method is provided for manufacturing, the method including processing a workpiece in a processing step, measuring a parameter characteristic of the processing performed on the workpiece in the processing step, and forming an output signal corresponding to the characteristic parameter measured. The method also includes setting a target value for the processing performed in the processing step based on the output signal.

54 Claims, 11 Drawing Sheets

METHOD FOR DETERMINING OPTIMAL PHOTOLITHOGRAPHY OVERLAY TARGETS BASED ON PROCESS PERFORMANCE AND YIELD IN MICROELECTRONIC FABRICATION

BACKGROUND OF THE INVENTION

1. Field of the Invention

This invention relates generally to semiconductor fabrication technology, and, more particularly, to a method for semiconductor fabrication supervision and optimization.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing defects in the manufacture of the components of a typical transistor also lowers the overall cost per transistor as well as the cost of integrated circuit devices incorporating such transistors.

The technologies underlying semiconductor processing tools have attracted increased attention over the last several years, resulting in substantial refinements. However, despite the advances made in this area, many of the processing tools that are currently commercially available suffer certain deficiencies. In particular, such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender nonoptimal control of critical processing parameters, such as throughput accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

Among the parameters it would be useful to monitor and control are critical dimensions (CDs) and doping levels for transistors (and other semiconductor devices), as well as overlay errors in photolithography. CDs are the smallest feature sizes that particular processing devices may be capable of producing. For example, the minimum widths w of polycrystalline (polysilicon or poly) gate lines for metal oxide semiconductor field effect transistors (MOSFETs or MOS transistors) may correspond to one CD for a semiconductor device having such transistors. Similarly, the junction depth $d_j$ (depth below the surface of a doped substrate to the bottom of a heavily doped source/drain region formed within the doped substrate) may be another CD for a semiconductor device such as an MOS transistor. Doping levels may depend on dosages of ions implanted into the semiconductor devices, the dosages typically being given in numbers of ions per square centimeter at ion implant energies typically given in keV.

However, traditional statistical process control (SPC) techniques are often inadequate to control precisely CDs and doping levels in semiconductor and microelectronic device manufacturing so as to optimize device performance and yield. Typically, SPC techniques set a target value, and a spread about the target value, for the CDs, doping levels, and/or overlay errors in photolithography. The SPC techniques then attempt to minimize the deviation from the target value without automatically adjusting and adapting the respective target values to optimize the semiconductor device performance, as measured by wafer electrical test (WET) measurement characteristics, for example, and/or to optimize the semiconductor device yield and throughput. Furthermore, blindly minimizing non-adaptive processing spreads about target values may not increase processing yield and throughput.

The present invention is directed to overcoming, or at least reducing the effects of, one or more of the problems set forth above.

SUMMARY OF THE INVENTION

In one aspect of the present invention, a method is provided for manufacturing, the method including processing a workpiece in a processing step, measuring a parameter characteristic of the processing performed on the workpiece in the processing step, and forming an output signal corresponding to the characteristic parameter measured. The method also includes setting a target value for the processing performed in the processing step based on the output signal.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which:

FIGS. 1–2 and 6–10 schematically illustrate a flow chart for various embodiments of a method for manufacturing according to the present invention;

FIGS. 3–5 schematically illustrate overlay errors in photolithography;

FIG. 11 schematically illustrates a method for fabricating a semiconductor device practiced in accordance with the present invention;

FIG. 12 schematically illustrates workpieces being processed using a photolithography processing tool, using a plurality of control input signals, in accordance with the present invention;

FIGS. 13–14 schematically illustrate one particular embodiment of the process and tool in FIG. 12; and FIG. 15 schematically illustrates one particular embodiment of the method of FIG. 11 as may be practiced with the process and tool of FIGS. 13–14.

Figure 1:
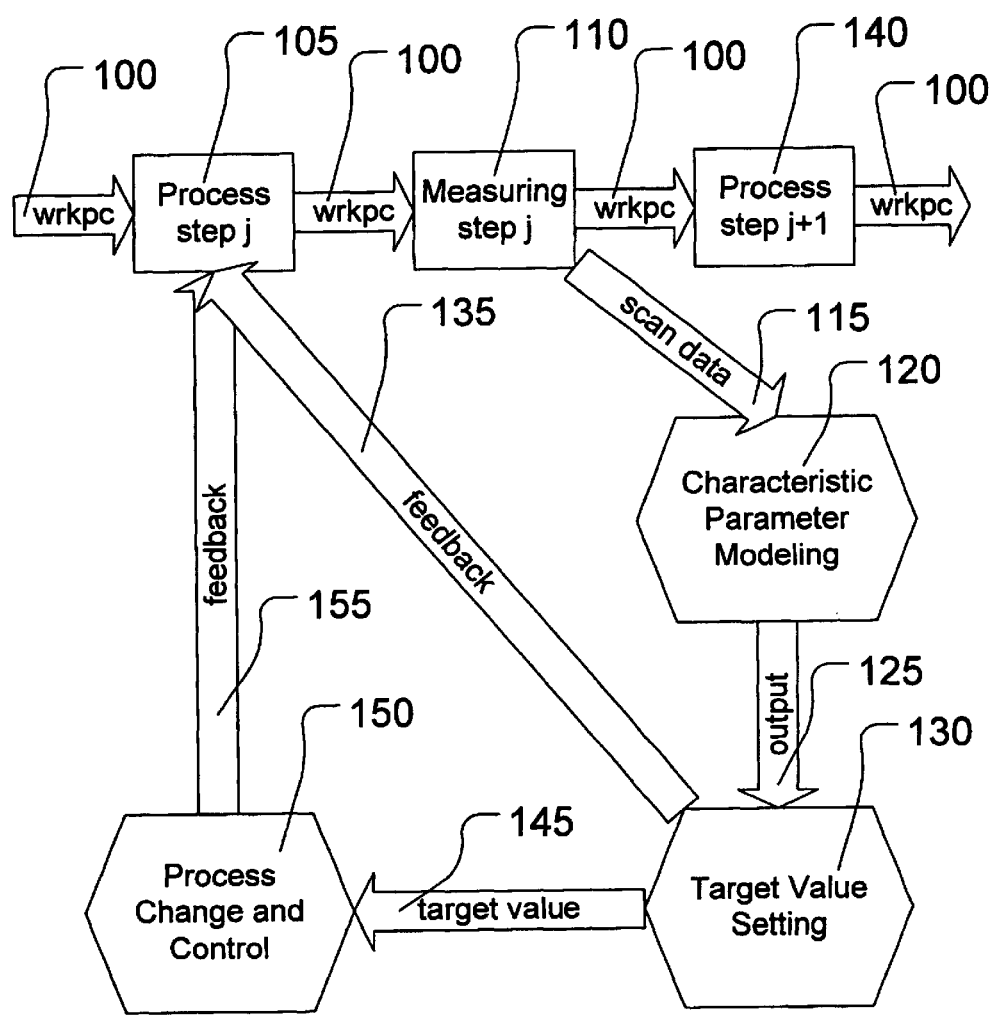
FIGS. 1–15 schematically illustrate various embodiments of a method for manufacturing according to the present invention; and, more particularly.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined-by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Illustrative embodiments of a method for manufacturing according to the present invention are shown in FIGS. 1–15. As shown in FIG. 1, a workpiece 100, such as a semiconducting substrate or wafer, having one or more process layers and/or semiconductor devices such as an MOS transistor disposed thereon, for example, is delivered to a processing step j 105, where j may have any value from j=1 to j=N. The total number N of processing steps, such as masking, etching, depositing material and the like, used to form the finished workpiece 100, may range from N=1 to about any finite value.

Figure 2:
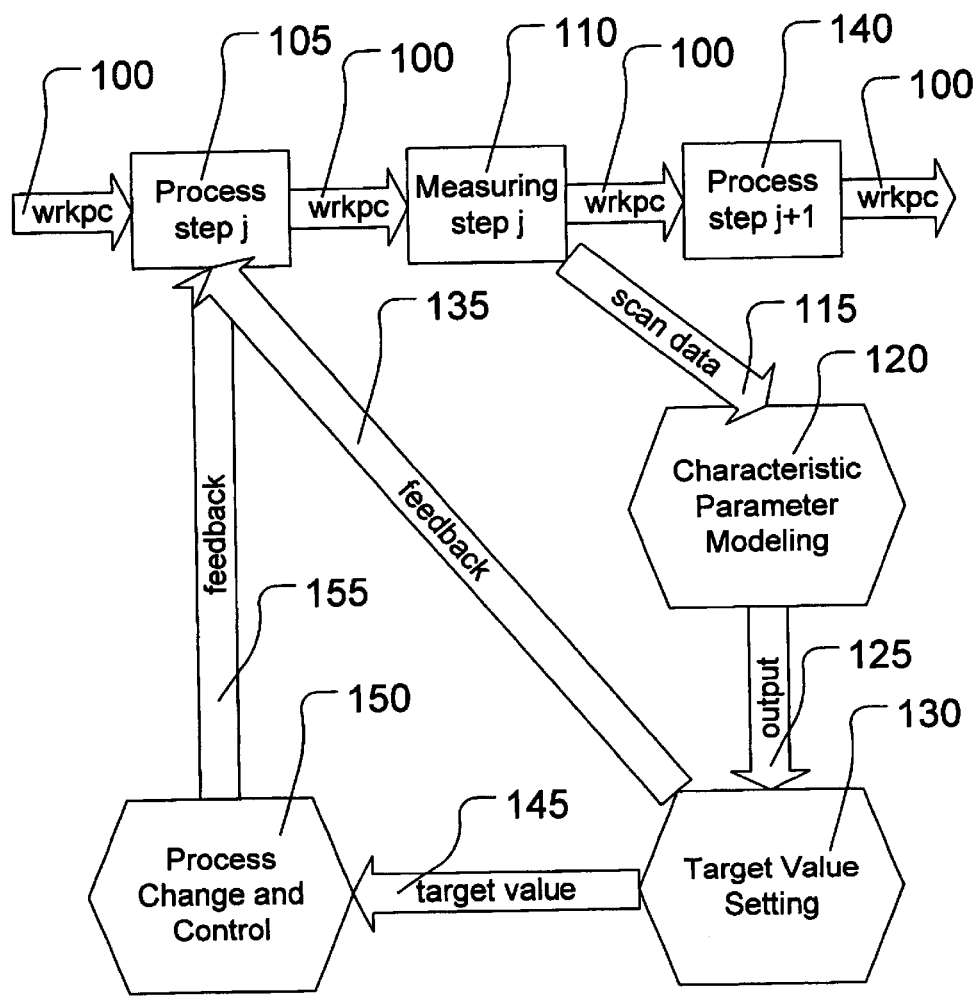

As shown in FIG. 2, the workpiece 100 is sent from the processing step j 105 and delivered to a measuring step j 110. In the measuring step j 110, the workpiece 100 is measured by having a metrology or measuring tool (not shown) measure one or more parameters characteristic of the processing performed in any of the previous processing steps (such as processing step j 105, where j may have any value from j=1 to j=N). The measurements in the measuring step j 110 produce scan data 115 indicative of the one or more characteristic parameters measured in the measuring step j 110. As shown in FIG. 2, if there is further processing to do on the workpiece 100 (if j<N), then the workpiece 100 may be sent from the measuring step j 110 and delivered to a processing step j+1 140 for further processing, and then sent on from the processing step j+1 140.

In various illustrative embodiments, there is no further processing (j=N) and the measuring step j=N 110 may be a wafer electrical test (WET) of the semiconductor device and/or devices and/or process layers formed on the workpiece 100. The WET may measure current and/or voltage responses of MOS transistors formed on the workpiece 100, for example, and/or capacitances and/or resistances of elements of MOS transistors formed on the workpiece 100. For example, the saturation drain-source current $I_{dsat}$ of MOS transistors formed on the workpiece 100 may be measured as an indicator of how fast the MOS transistors formed on the workpiece 100 may be switched from "on" to "off" states.

Figure 3:
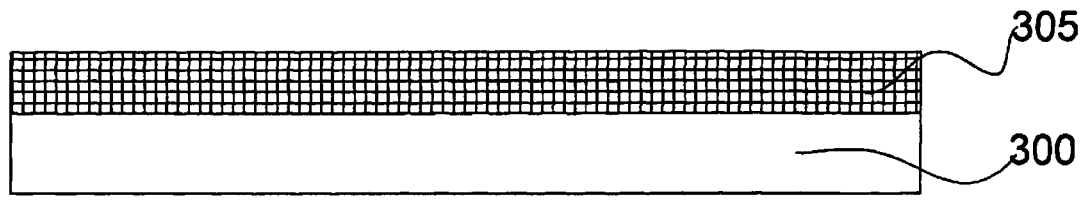
Figure 4:
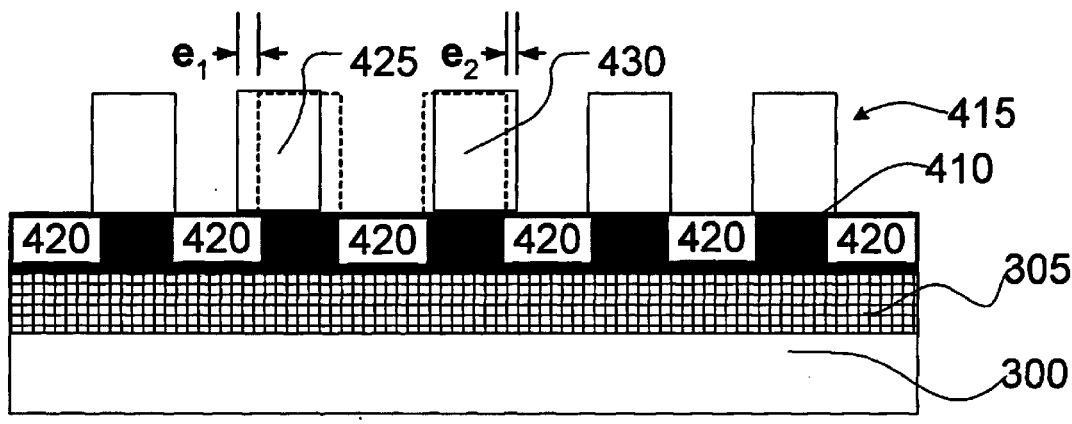
Figure 5:
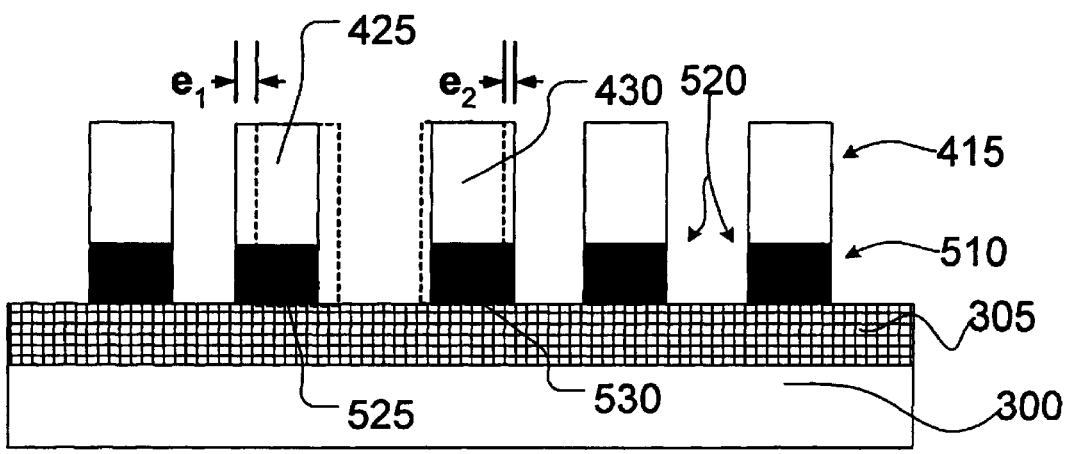

In various illustrative alternative embodiments, there is further processing to do on the workpiece 100 (j<N) and the measuring step j 110 may be a photolithography overlay error measurement of a process layer formed on the workpiece 100. FIGS. 3–5 schematically illustrate photolithography overlay error. As shown in FIG. 3, a dielectric layer 305 may be formed above a structure 300, such as a semiconducting substrate (e.g., a silicon wafer). The dielectric layer 305 may be formed by a variety of known techniques for forming such layers, e.g., chemical vapor deposition (CVD), low-pressure CVD (LPCVD), plasma-enhanced CVD (PECVD), sputtering and physical vapor deposition (PVD), and the like, and may have a thickness ranging from approximately 100–2000 Å, for example. The dielectric layer 305 may be formed from a variety of dielectric materials and may, for example, be an oxide (e.g., Ge oxide), a nitride (e.g., GaAs nitride), an oxynitride (e.g., GaP oxynitride), silicon dioxide ($SiO_2$), a nitrogen-bearing oxide (e.g., nitrogen-bearing $SiO_2$), a nitrogen-doped oxide (e.g., $N_2$-implanted $SiO_2$), silicon nitride ($Si_3N_4$), silicon oxynitride ($Si_xO_yN_z$), and the like. In one illustrative embodiment, the dielectric layer 305 is comprised of a silicon dioxide ($SiO_2$) having a thickness of approximately 500 Å, which is formed by an LPCVD process for higher throughput.

As shown in FIG. 4, a polycrystalline silicon or poly layer 410 may be formed above the dielectric layer 305. The poly layer 410 may be formed by a variety of known techniques for forming such layers, e.g., CVD, LPCVD, PECVD, PVD, and the like, and may have a thickness ranging from approximately 500–2000 Å. In one illustrative embodiment, the poly layer 410 has a thickness of approximately 1000 Å and is formed by an LPCVD process for higher throughput.

As shown in FIG. 4, a mask 415 of photoresist, for example, may be formed and patterned above the poly layer 410, exposing portions 420 of the poly layer 410. The photoresist mask 415 may have a thickness ranging from approximately 5000–15000 Å (5 k Å–15 k Å), for example. As shown in FIGS. 4–5, the portions 420 of the poly layer 410 may be removed, by being etched away, for example, using the photoresist mask 415, forming the features 520.

As shown in FIGS. 4–5, the features 520 may be formed using a variety of known photolithography and etching techniques, such as an anisotropic etching process using hydrogen bromide (HBr) and argon (Ar) as the etchant gases, for example. As shown in FIGS. 4–5, photoresist masks 425 and 430 may be formed with respective photolithography overlay errors $\epsilon_1$ and $\epsilon_2$, as indicated, from the positions where the photoresist masks 425 and 430 should be formed (shown in phantom). As a result of the respective photolithography overlay errors $\epsilon_1$ and E2, corresponding features 525 and 530 may be formed in positions different from the positions where the features 525 and 530 should be formed (shown in phantom). An overlay measurement at the measuring step j 110 of features 525 and 530 would duly note photolithography overlay errors $\epsilon_1$ and $\epsilon_2$, respectively, and this would be reported in the scan data 115.

Figure 6:
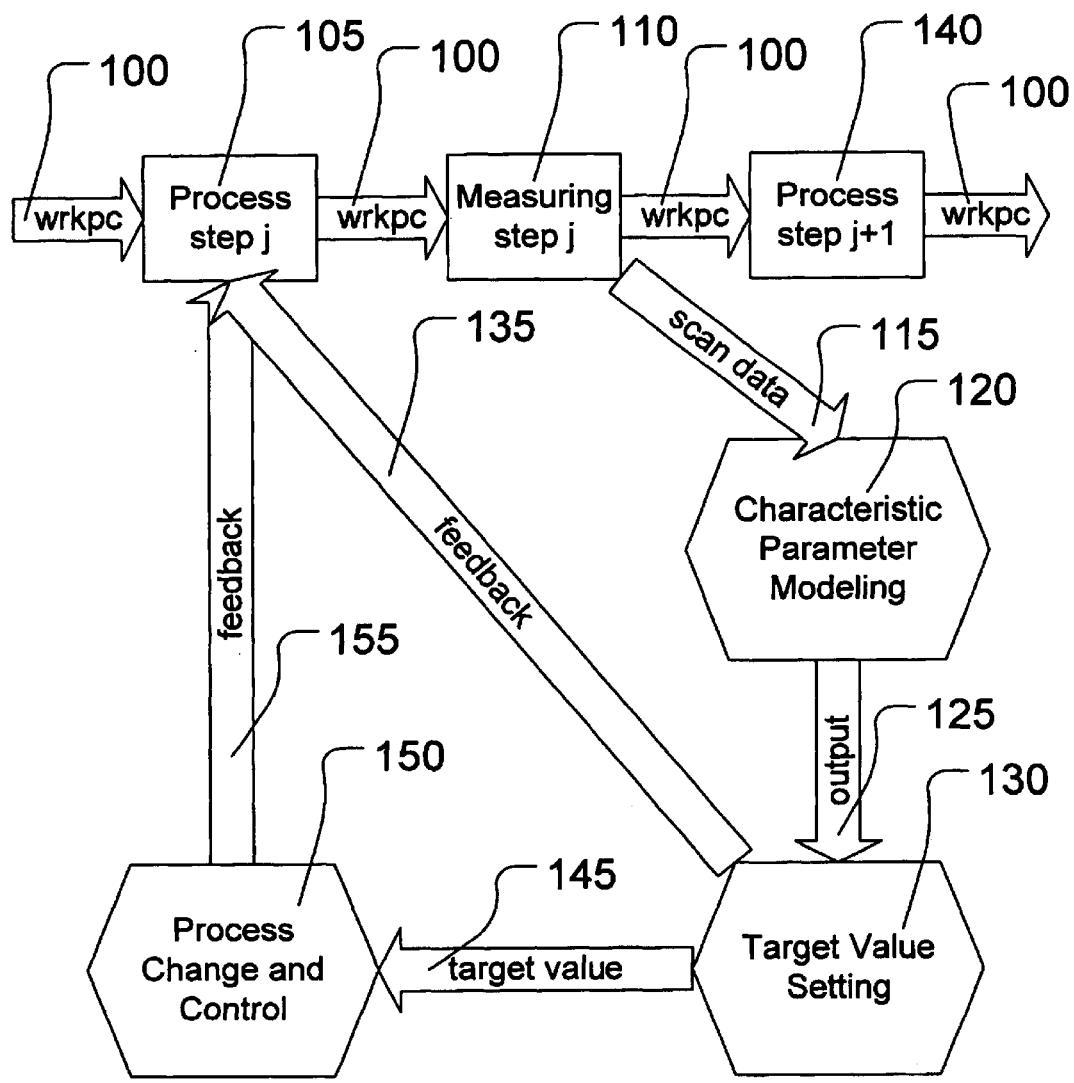

As shown in FIG. 6, the scan data 115 is sent from the measuring step j 110 and delivered to a characteristic parameter modeling step 120. In the characteristic parameter modeling step 120, the one or more characteristic parameters measured in the measuring step j 110 may be input into a characteristic parameter model. The characteristic parameter model may map the one or more characteristic parameters measured in the measuring step j 110 onto one or more parameters that specify the processing performed in any of the previous processing steps (such as processing step j 105, where j may have any value from j=1 to j=N). Delivering the scan data 115 to the characteristic parameter model in the characteristic parameter modeling step 120 produces an output signal 125.

Figure 7:
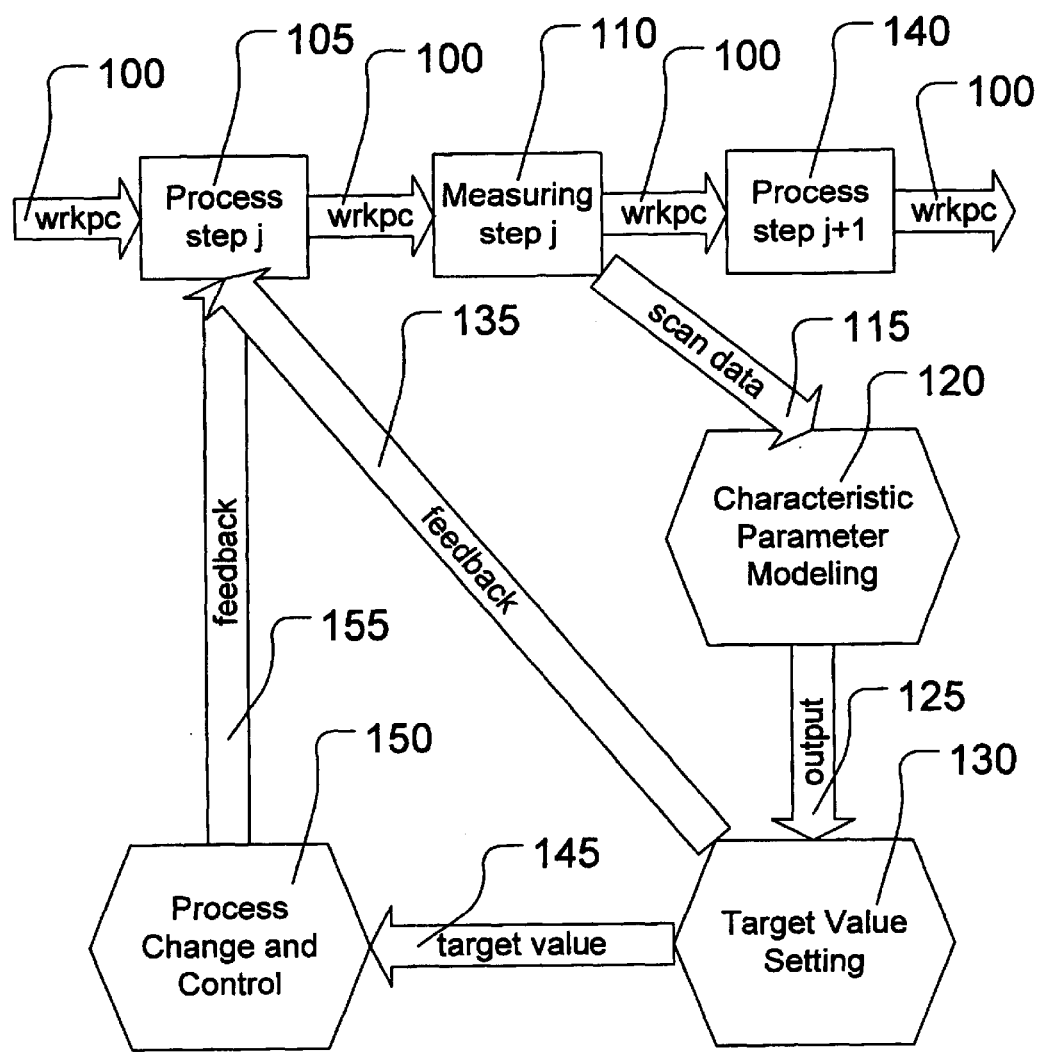

As shown in FIG. 7, the output signal 125 is sent from the characteristic parameter modeling step 120 and delivered to a target value setting step 130. In the target value setting step 130, the characteristic parameter model may be inverted to define one or more changes in the processing performed in any of the previous processing steps (such as processing step j 105, where j may have any value from j=1 to j=N) that need to be made to bring the one or more characteristic parameter values measured in the measuring step j 110 within a range of specification values.

The inversion of the characteristic parameter model (based on the output signal 125) in the target value setting step 130 may be used to alert an engineer of the need to adjust the processing performed any of the previous processing steps (such as processing step j 105, where j may have any value from j=1 to j=N). The engineer may also alter, for example, the type of characteristic parameter modeled in the characteristic parameter modeling step 120, affecting the output signal 125 produced.

Figure 8:
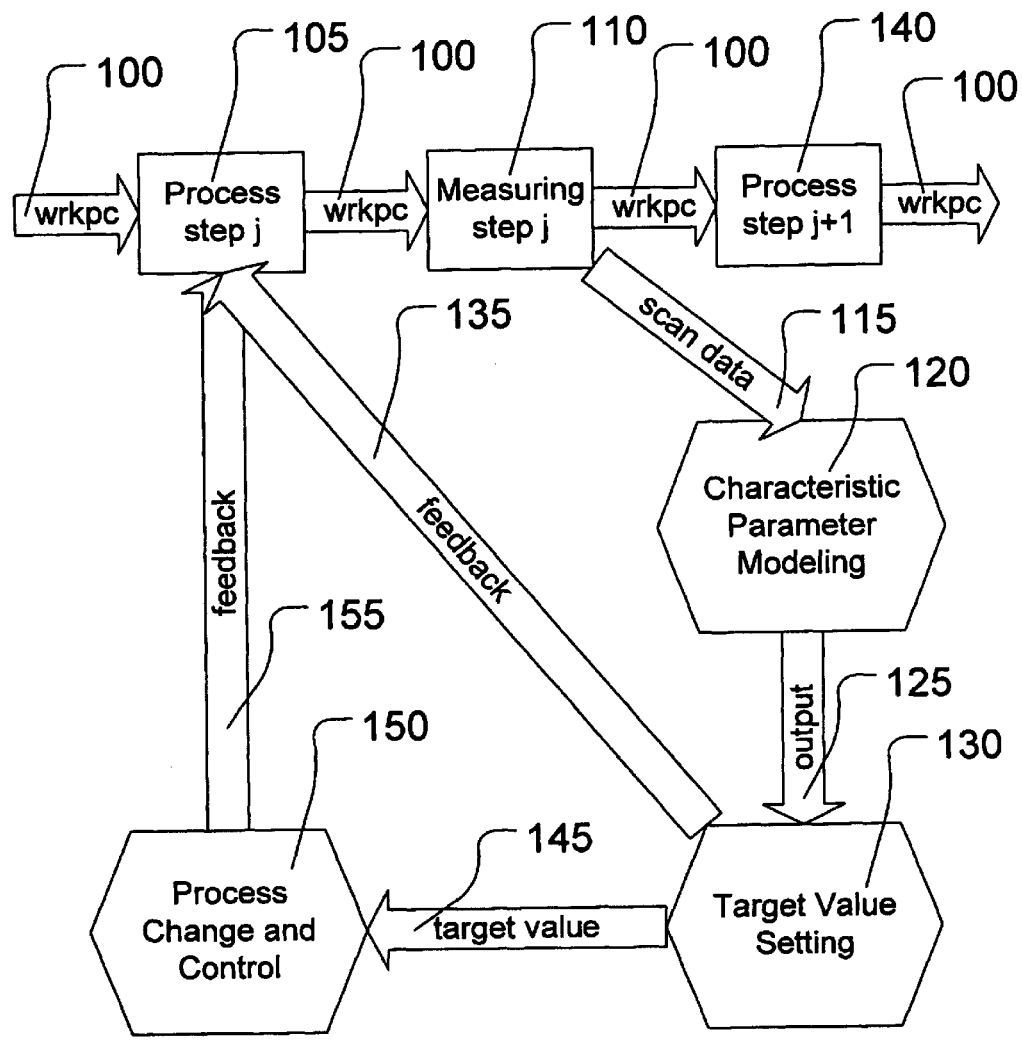

As shown in FIG. 8, a feedback control signal 135 may be sent from the target value setting step 130 to the processing step j 105 to adjust the processing performed in the processing step j 105. In various alternative illustrative embodiments (not shown), the feedback control signal 135 may be sent from the target value setting step 130 to any of the previous processing steps (similar to processing step j 105, where j may have any value from j=1 to j=N) to adjust the processing performed in any of the previous processing steps.

Figure 9:
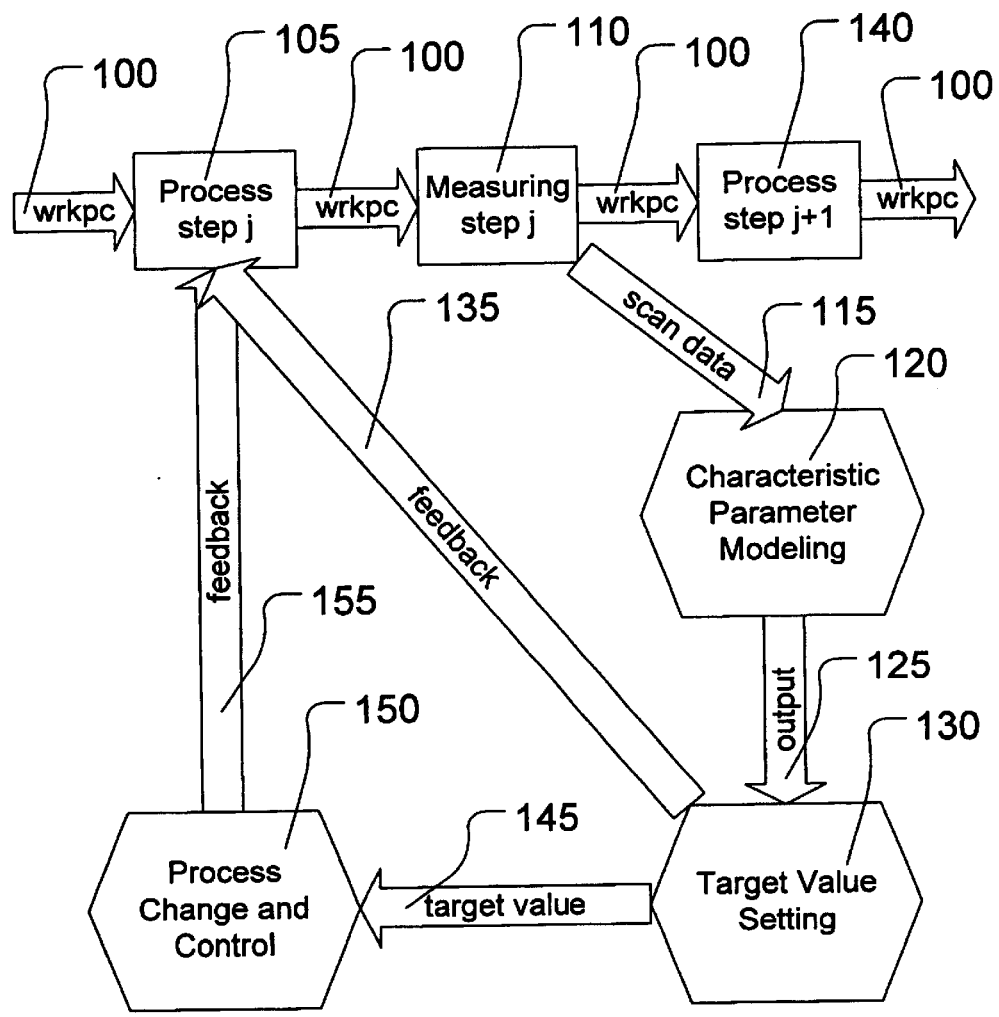
Figure 10:
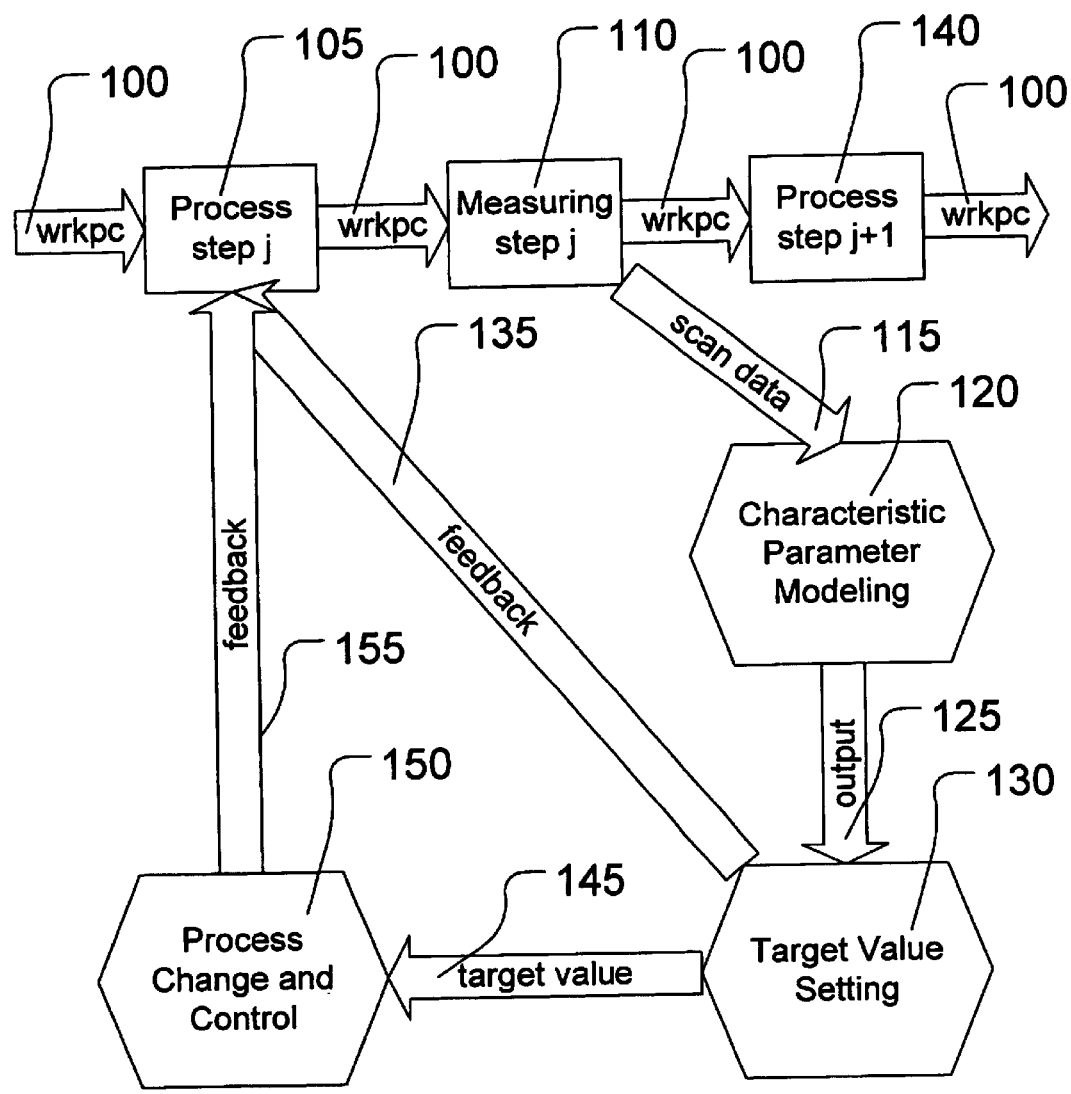

As shown in FIG. 9, in addition to, and/or instead of, the feedback control signal 135, target values 145 may be sent from the target value setting step 130 to a process change and control step 150. In the process change and control step 150, the target values 145 may be used in a high-level supervisory control loop. Thereafter, as shown in FIG. 10, a feedback control signal 155 may be sent from the process change and control step 150 to the processing step j 105 to adjust the processing performed in the processing step j 105. In various alternative illustrative embodiments (not shown), the feedback control signal 155 may be sent from the process change and control step 150 to any of the previous processing steps (similar to processing step j 105, where j may have any value from j=1 to j=N) to adjust the processing performed in any of the previous processing steps.

In various illustrative embodiments, as described above, there is further processing (j<N) and the measuring step j=N 110 may be a photolithography overlay error test (POET). The POET measurements, represented generally by a vector $\epsilon$, may be put into a semiconductor device yield model, represented generally by a function $Y(\epsilon)$, which maps the POET measurements $\epsilon$ into a measure of the semiconductor device yield, represented generally by a scalar y, characteristic of the processing performed in at least one of the processing steps j 105, where j may have any value from j=1 to j=N−1, so that $Y(\epsilon)=y$. The semiconductor device yield model may be optimized by finding the maximum of $Y(\epsilon)=y$, with respect to variations in the POET measurements $\epsilon$.

For example, if $Y(\epsilon)=y=Y(|\epsilon|)=|\epsilon|^n \exp(-a|\epsilon|)$, then the condition $\partial Y(|\epsilon|)/\partial|\epsilon|=0=n|\epsilon|^{n-1}\exp(-\alpha|\epsilon|)-\alpha|\epsilon|\exp(-\alpha|\epsilon|)=(n-\alpha|\epsilon|)|\epsilon|^{n-1}\exp(-\alpha|\epsilon|)$ defines the extrema of $Y(\epsilon)=y=Y(|\epsilon|)=|\epsilon|^n\exp(-\alpha|\epsilon|)$. The further condition $\partial^2 Y(|\epsilon|)/\partial|\epsilon|^2=-\alpha|\epsilon|^{n-1}\exp(-\alpha|\epsilon|)<0$ at $n=\alpha|\epsilon|$ confirms that $n=\alpha|\epsilon|$ maximizes $Y(\epsilon)=y=Y(|\epsilon|)=|\epsilon|^n\exp(-\alpha|\epsilon|)$.

In various illustrative embodiments, the engineer may be provided with advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These capabilities may engender more optimal control of critical processing parameters, such as throughput accuracy, stability and repeatability, processing temperatures, mechanical tool parameters, and the like. This more optimal control of critical processing parameters reduces this variability. This reduction in variability manifests itself as fewer within-run disparities, fewer run-to-run disparities and fewer tool-to-tool disparities. This reduction in the number of these disparities that can propagate means fewer deviations in product quality and performance. In such an illustrative embodiment of a method of manufacturing according to the present invention, a monitoring and diagnostics system may be provided that monitors this variability and optimizes control of critical parameters.

Figure 11:
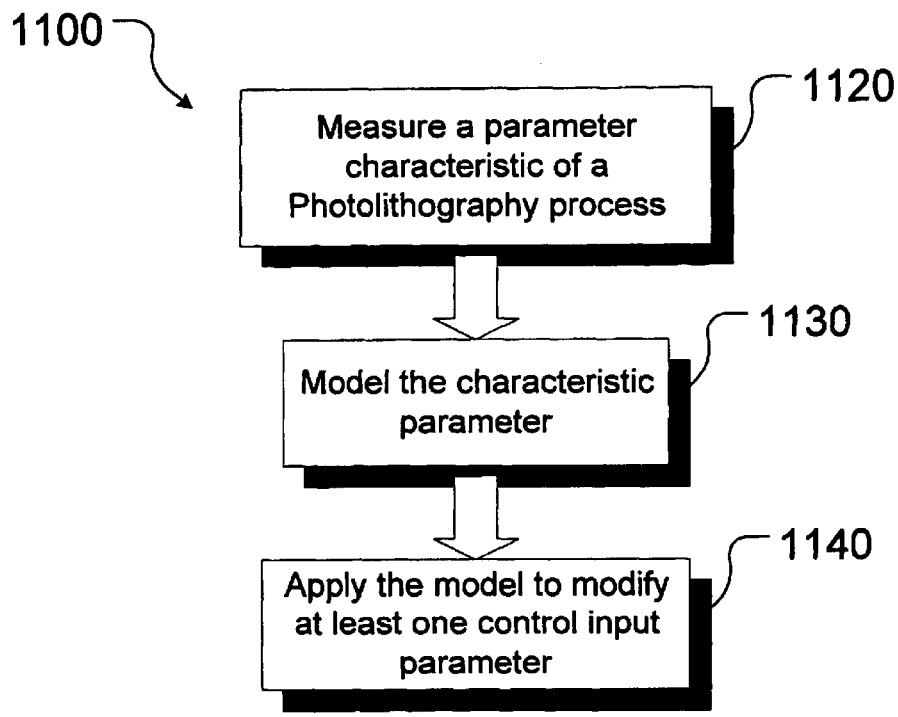
Figure 12:
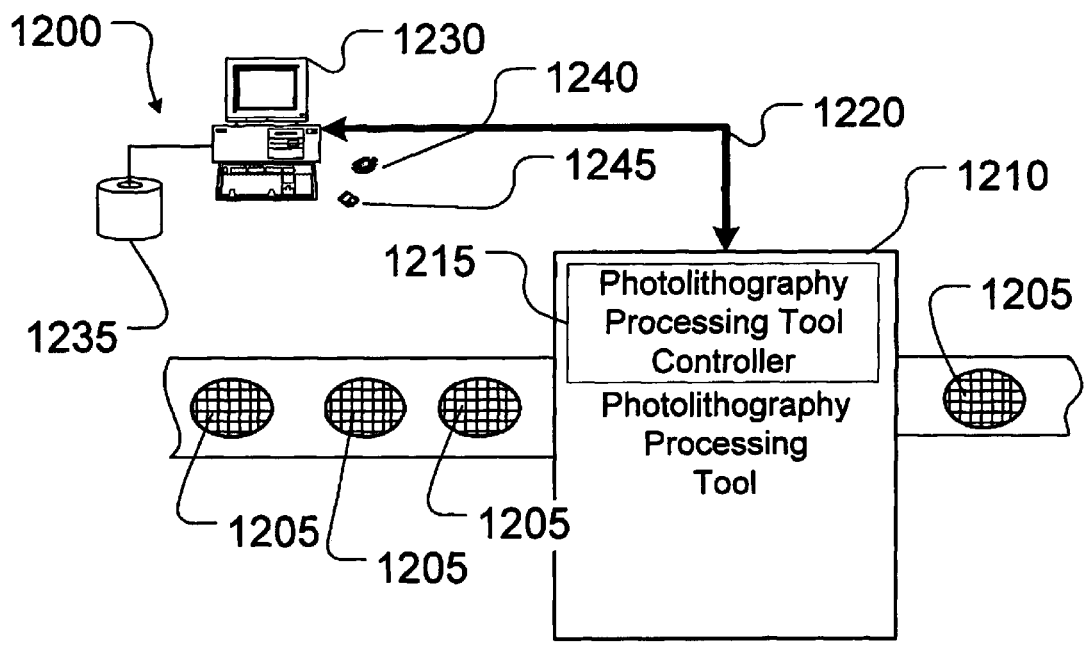

FIG. 11 illustrates one particular embodiment of a method 1100 practiced in accordance with the present invention. FIG. 12 illustrates one particular apparatus 1200 with which the method 1100 may be practiced. For the sake of clarity, and to further an understanding of the invention, the method 1100 shall be disclosed in the context of the apparatus 1200. However, the invention is not so limited and admits wide variation, as is discussed further below.

Referring now to both FIGS. 11 and 12, a batch or lot of workpieces or wafers 1205 is being processed through a photolithography processing tool 1210. The photolithography processing tool 1210 may be any photolithography processing tool known to the art, provided it includes the requisite control capabilities. The photolithography processing tool 1210 includes a photolithography processing tool controller 1215 for this purpose. The nature and function of the photolithography processing tool controller 1215 will be implementation specific. For instance, the photolithography processing tool controller 1215 may control photolithography control input parameters such as a "stepper" x-translation signal, a stepper y-translation signal, an x-expansion wafer scale signal, a y-expansion wafer scale signal, a reticle magnification signal, and a reticle rotation signal, and the like. Four workpieces 1205 are shown in FIG. 12, but the lot of workpieces or wafers, i.e., the "wafer lot," may be any practicable number of wafers from one to any finite number.

The method 1100 begins, as set forth in box 1120, by measuring a parameter characteristic of the photolithography processing performed on the workpiece 1205 in the photolithography processing tool 1210. The nature, identity, and measurement of characteristic parameters will be largely implementation specific and even tool specific. For instance, capabilities for monitoring process parameters vary, to some degree, from tool to tool. Greater sensing capabilities may permit wider latitude in the characteristic parameters that are identified and measured and the manner in which this is done. Conversely, lesser sensing capabilities may restrict this latitude. For example, a photolithography tool may read the photolithography overlay error (POE) of features on a workpiece 1205 (see FIGS. 4–5), and/or an average of the POE's of the workpieces 1205 in a lot, using a metrology tool (not shown), but this metrology tool may vary from wafer to wafer depending on the ambient temperature of the wafer(s). The POE metrology tool typically does not feedback the POE information to the photolithography tool. The POE of a workpiece 1205, and/or an average of the POE's of the workpieces 1205 in a lot, is an illustrative example of a parameter characteristic of the photolithography processing performed on the workpiece in the photolithography processing tool 1210.

Turning to FIG. 12, in this particular embodiment, the photolithography process characteristic parameters are measured and/or monitored by tool sensors (not shown). The outputs of these tool sensors are transmitted to a computer system 1230 over a line 1220. The computer system 1230 analyzes these sensor outputs to identify the characteristic parameters.

Returning, to FIG. 11, once the characteristic parameter is identified and measured, the method 1100 proceeds by modeling the measured and identified characteristic parameter, as set forth in box 1130. The computer system 1230 in FIG. 12 is, in this particular embodiment, programmed to model the characteristic parameter. The manner in which this modeling occurs will be implementation specific.

In the embodiment of FIG. 12, a database 1235 stores a plurality of models that might potentially be applied, depending upon which characteristic parameter is identified. This particular embodiment, therefore, requires some a priori knowledge of the characteristic parameters that might be measured. The computer system 1230 then extracts an appropriate model from the database 1235 of potential models to apply to the identified characteristic parameters. If the database 1235 does not include an appropriate model, then the characteristic parameter may be ignored, or the computer system 1230 may attempt to develop one, if so programmed. The database 1235 may be stored on any kind of computer-readable, program storage medium, such as an optical disk 1240, a floppy disk 1245, or a hard disk drive (not shown) of the computer system 1230. The database 1235 may also be stored on a separate computer system (not shown) that interfaces with the computer system 1230.

Modeling of the identified characteristic parameter may be implemented differently in alternative embodiments. For instance, the computer system 1230 may be programmed using some form of artificial intelligence to analyze the sensor outputs and controller inputs to develop a model on-the-fly in a real-time implementation. This approach might be a useful adjunct to the embodiment illustrated in FIG. 12, and discussed above, where characteristic parameters are measured and identified for which the database 1235 has no appropriate model.

The method 1100 of FIG. 11 then proceeds by applying the model to modify a photolithography control input parameter, as set forth in box 1140. Depending on the implementation, applying the model may yield either a new value for the photolithography control input parameter or a correction to the existing photolithography control input parameter. The new photolithography control input is then formulated from the value yielded by the model and is transmitted to the photolithography processing tool controller 1215 over the line 1220. The photolithography processing tool controller 1215 then controls subsequent photolithography process operations in accordance with the new photolithography control inputs.

Some alternative embodiments may employ a form of feedback to improve the modeling of characteristic parameters. The implementation of this feedback is dependent on several disparate facts, including the tool's sensing capabilities and economics. One technique for doing this would be to monitor at least one effect of the model's implementation and update the model based on the effect(s) monitored. The update may also depend on the model. For instance, a linear model may require a different update than would a non-linear model, all other factors being the same.

As is evident from the discussion above, some features of the present invention are implemented in software. For instance, the acts set forth in the boxes 1120–1140 in FIG. 11 are, in the illustrated embodiment, software-implemented, in whole or in part. Thus, some features of the present invention are implemented as instructions encoded on a computer-readable, program storage medium. The program storage medium may be of any type suitable to the particular implementation. However, the program storage medium will typically be magnetic, such as the floppy disk 1245 or the computer 1230 hard disk drive (not shown), or optical, such as the optical disk 1240. When these instructions are executed by a computer, they perform the disclosed functions. The computer may be a desktop computer, such as the computer 1230. However, the computer might alternatively be a processor embedded in the photolithography processing tool 1210. The computer might also be a laptop, a workstation, or a mainframe in various other embodiments. The scope of the invention is not limited by the type or nature of the program storage medium or computer with which embodiments of the invention might be implemented.

Thus, some portions of the detailed descriptions herein are, or may be, presented in terms of algorithms, functions, techniques, and/or processes. These terms enable those skilled in the art most effectively to convey the substance of their work to others skilled in the art. These terms are here, and are generally, conceived to be a self-consistent sequence of steps leading to a desired result. The steps are those requiring physical manipulations of physical quantities. Usually, though not necessarily, these quantities take the form of electromagnetic signals capable of being stored, transferred, combined, compared, and otherwise manipulated.

It has proven convenient at times, principally for reasons of common usage, to refer to these signals as bits, values, elements, symbols, characters, terms, numbers, and the like. All of these and similar terms are to be associated with the appropriate physical quantities and are merely convenient labels applied to these quantities and actions. Unless specifically stated otherwise, or as may be apparent from the discussion, terms such as "processing," "computing," "calculating," "determining," "displaying," and the like, used herein refer to the action(s) and processes of a computer system, or similar electronic and/or mechanical computing device, that manipulates and transforms data, represented as physical (electromagnetic) quantities within the computer system's registers and/or memories, into other data similarly represented as physical quantities within the computer system's memories and/or registers and/or other such information storage, transmission and/or display devices.

Figure 13:
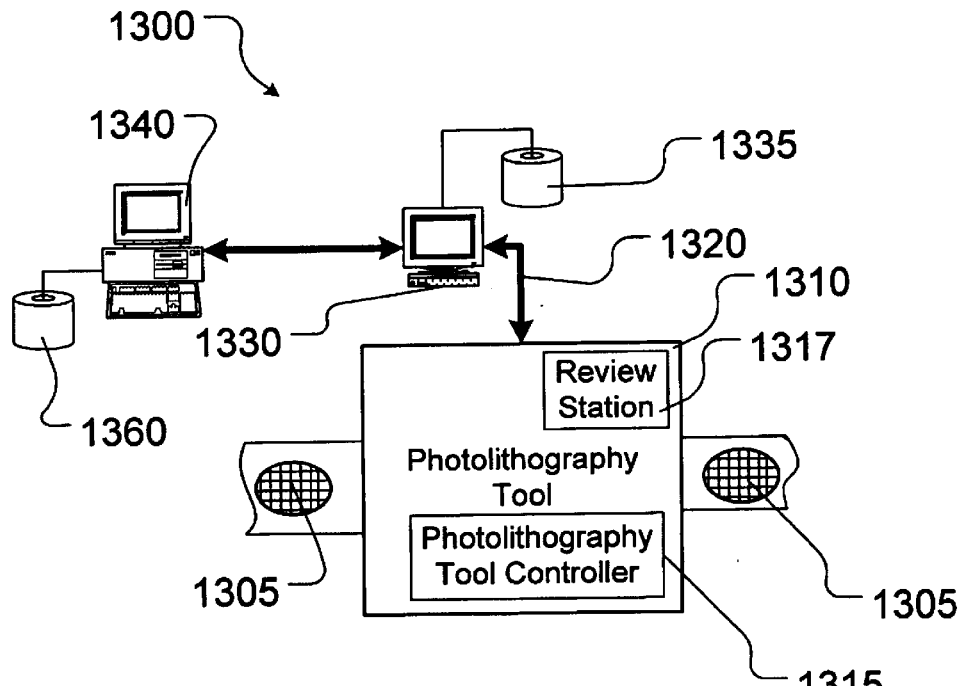
Figure 14:
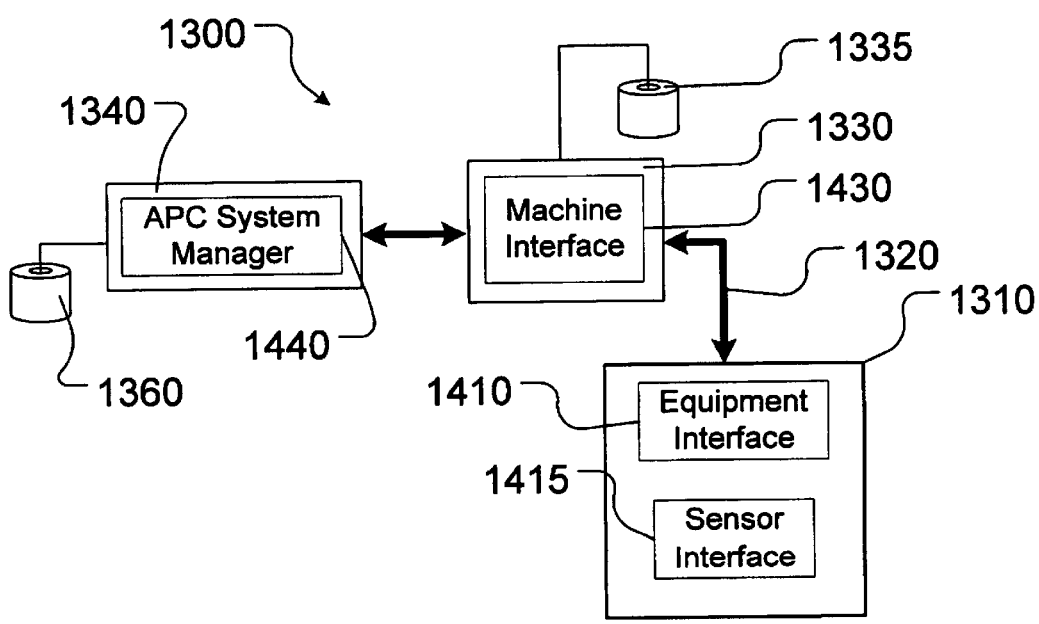

Construction of an Illustrative Apparatus. An exemplary embodiment 1300 of the apparatus 1200 in FIG. 12 is illustrated in FIGS. 13–14, in which the apparatus 1300 comprises a portion of an Advanced Process Control ("APC") system. FIGS. 13–14 are conceptualized, structural and functional block diagrams, respectively, of the apparatus 1300. A set of processing steps is performed on a lot of wafers 1305 on a photolithography processing tool 1310. Because the apparatus 1300 is part of an APC system, the wafers 1305 are processed on a run-to-run basis. Thus, process adjustments are made and held constant for the duration of a run, based on run-level measurements or averages. A "run" may be a lot, a batch of lots, or even an individual wafer.

In this particular embodiment, the wafers 1305 are processed by the photolithography processing tool 1310 and various operations in the process are controlled by a plurality of photolithography control input signals on a line 1320 between the photolithography processing tool 1310 and a workstation 1330. Exemplary photolithography control inputs for this embodiment might include a stepper x-translation signal, a stepper y-translation signal, an x-expansion wafer scale signal, a y-expansion wafer scale signal, a reticle magnification signal, and a reticle rotation signal, and the like.

When a process step in the photolithography processing tool 1310 is concluded, the semiconductor wafers 1305 being processed in the photolithography processing tool 1310 are examined in a review station 1317. The photolithography control inputs generally affect the POE of the semiconductor wafers 1305 and, hence, the variability and properties of the features patterned by the photolithography processing tool 1310 on the wafers 1305. Once errors are determined from the examination after the run of a lot of wafers 1305, the photolithography control inputs on the line 1320 are modified for a subsequent run of a lot of wafers 1305. Modifying the control signals on the line 1320 is designed to improve the next process step in the photolithography processing tool 1310. The modification is performed in accordance with one particular embodiment of the method 1100 set forth in FIG. 11, as described more fully below. Once the relevant photolithography control input signals for the photolithography processing tool 1310 are updated, the photolithography control input signals with new settings are used for a subsequent run of semiconductor devices.

Referring now to both FIGS. 13 and 14, the photolithography processing tool 1310 communicates with a manufacturing framework comprising a network of processing modules. One such module is an APC system manager 1440 resident on the computer 1340. This network of processing modules constitutes the APC system. The photolithography processing tool 1310 generally includes an equipment interface 1410 and a sensor interface 1415. A machine interface 1430 resides on the workstation 1330. The machine interface 1430 bridges the gap between the APC framework, e.g., the APC system manager 1440, and the equipment interface 1410. Thus, the machine interface 1430 interfaces the photolithography processing tool 1310 with the APC framework and supports machine setup, activation, monitoring, and data collection. The sensor interface 1415 provides the appropriate interface environment to communicate with external sensors such as LabView® or other sensor bus-based data acquisition software. Both the machine interface 1430 and the sensor interface 1415 use a set of functionalities (such as a communication standard) to collect data to be used. The equipment interface 1410 and the sensor interface 1415 communicate over the line 1320 with the machine interface 1430 resident on the workstation 1330.

More particularly, the machine interface 1430 receives commands, status events, and collected data from the equipment interface 1410 and forwards these as needed to other APC components and event channels. In turn, responses from APC components are received by the machine interface 1430 and rerouted to the equipment interface 1410. The machine interface 1430 also reformats and restructures messages and data as necessary. The machine interface 1430 supports the startup/shutdown procedures within the APC System Manager 1440. It also serves as an APC data collector, buffering data collected by the equipment interface 1410, and emitting appropriate data collection signals.

In the particular embodiment illustrated, the APC system is a factory-wide software system, but this is not necessary to the practice of the invention. The control strategies taught by the present invention can be applied to virtually any semiconductor photolithography processing tool on a factory floor. Indeed, the present invention may be simultaneously employed on multiple photolithography processing tools in the same factory or in the same fabrication process. The APC framework permits remote access and monitoring of the process performance. Furthermore, by utilizing the APC framework, data storage can be more convenient, more flexible, and less expensive than data storage on local drives. However, the present invention may be employed, in some alternative embodiments, on local drives.

The illustrated embodiment deploys the present invention onto the APC framework utilizing a number of software components. In addition to components within the APC framework, a computer script is written for each of the semiconductor photolithography processing tools involved in the control system. When a semiconductor photolithography processing tool in the control system is started in the semiconductor manufacturing fab, the semiconductor photolithography processing tool generally calls upon a script to initiate the action that is required by the photolithography processing tool controller. The control methods are generally defined and performed using these scripts. The development of these scripts can comprise a significant portion of the development of a control system.

In this particular embodiment, there are several separate software scripts that perform the tasks involved in controlling the photolithography processing operation. There is one script for the photolithography processing tool 1310, including the review station 1317 and the photolithography processing tool controller 1315. There is also a script to handle the actual data capture from the review station 1317 and another script that contains common procedures that can be referenced by any of the other scripts. There is also a script for the APC system manager 1440. The precise number of scripts, however, is implementation specific and alternative embodiments may use other numbers of scripts.

Figure 15:
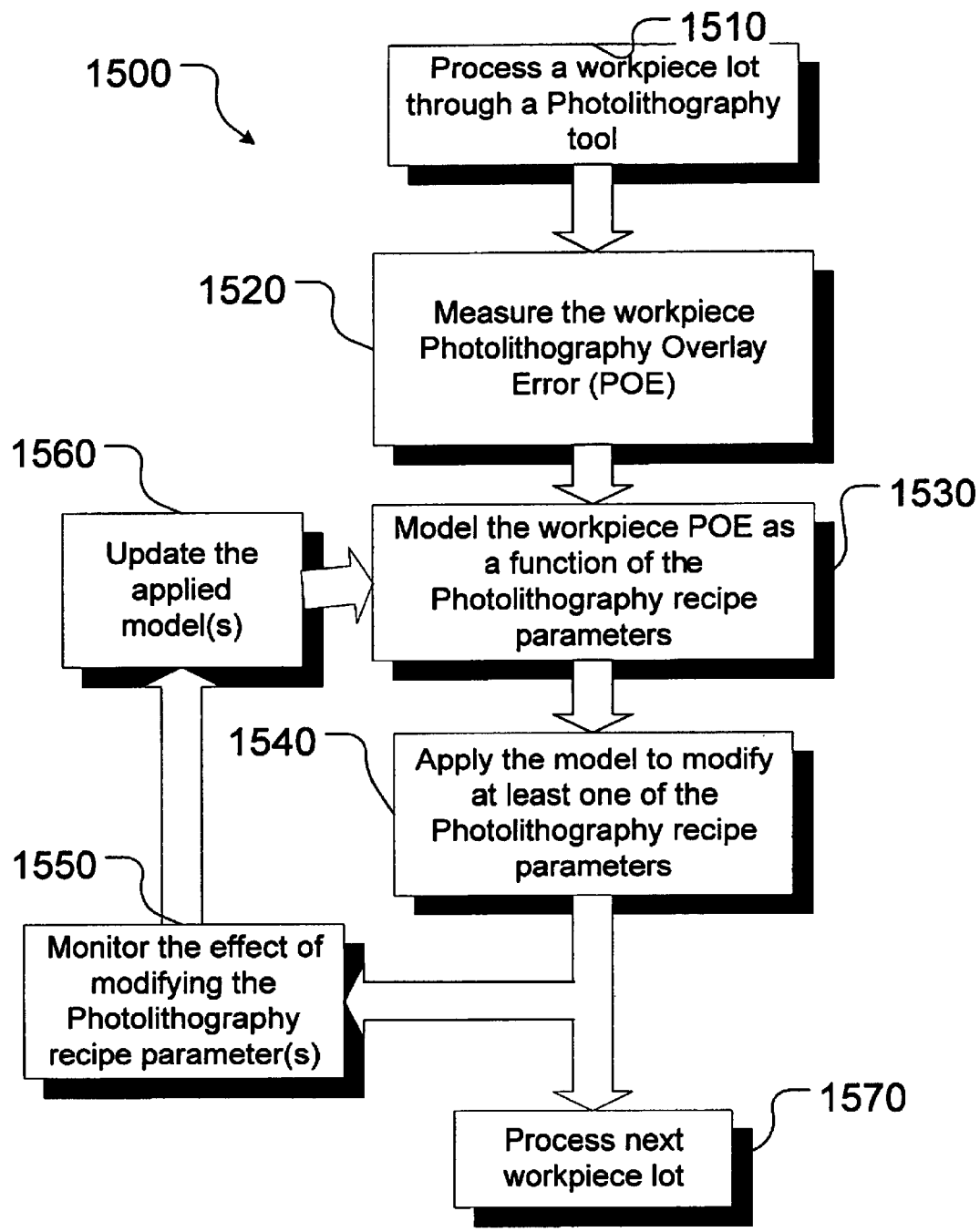

Operation of an Illustrative Apparatus. FIG. 15 illustrates one particular embodiment 1500 of the method 1100 in FIG. 11. The method 1500 may be practiced with the apparatus 1300 illustrated in FIGS. 13–14, but the invention is not so limited. The method 1500 may be practiced with any apparatus that may perform the functions set forth in FIG. 15. Furthermore, the method 1100 in FIG. 11 may be practiced in embodiments alternative to the method 1500 in FIG. 15.

Referring now to all of FIGS. 13–15, the method 1500 begins with processing a lot of wafers 1305 through a photolithography processing tool 1310, as set forth in box 1510. In this particular embodiment, the photolithography processing tool 1310 has been initialized for processing by the APC system manager 1440 through the machine interface 1430 and the equipment interface 1410. In this particular embodiment, before the photolithography processing tool 1310 is run, the APC system manager script is called to initialize the photolithography processing tool 1310. At this step, the script records the identification number of the photolithography processing tool 1310 and the lot number of the wafers 1305. The identification number is then stored against the lot number in a data store 1360. The rest of the script, such as the APCData call and the Setup and StartMachine calls, are formulated with blank or dummy data in order to force the machine to use default settings.

As part of this initialization, the initial setpoints for photolithography control are provided to the photolithography processing tool controller 1315 over the line 1320. These initial setpoints may be determined and implemented in any suitable manner known to the art. In the particular embodiment illustrated, photolithography controls are implemented by control threads. Each control thread acts like a separate controller and is differentiated by various process conditions. For photolithography control, the control threads are separated by a combination of different conditions. These conditions may include, for example, the semiconductor photolithography processing tool 1310 currently processing the wafer lot, the semiconductor product, the semiconductor manufacturing operation, and one or more of the semiconductor processing tools (not shown) that previously processed the semiconductor wafer lot.

Control threads are separated because different process conditions affect the photolithography overlay error (POE) differently. By isolating each of the process conditions into its own corresponding control thread, the POE can become a more accurate portrayal of the conditions in which a subsequent semiconductor wafer lot in the control thread will be processed. Since the error measurement is more relevant, changes to the photolithography control input signals based upon the error will be more appropriate.

The control thread for the photolithography control scheme depends upon the current photolithography processing tool, current operation, the product code for the current lot, and the identification number at a previous processing step. The first three parameters are generally found in the context information that is passed to the script from the photolithography processing tool 1310. The fourth parameter is generally stored when the lot is previously processed. Once all four parameters are defined, they are combined to form the control thread name; PHOT02_OPER01_PROD01_PHOT01 is an example of a control thread name. The control thread name is also stored in correspondence to the wafer lot number in the data store 1360.

Once the lot is associated with a control thread name, the initial settings for that control thread are generally retrieved from the data store 1360. There are at least two possibilities when the call is made for the information. One possibility is that there are no settings stored under the current control thread name. This can happen when the control thread is new, or if the information was lost or deleted. In these cases, the script initializes the control thread assuming that there is no error associated with it and uses the target values of the photolithography errors as the photolithography control input settings. It is preferred that the controllers use the default machine settings as the initial settings. By assuming some settings, the photolithography errors can be related back to the control settings in order to facilitate feedback control.

Another possibility is that the initial settings are stored under the control thread name. In this case, one or more wafer lots have been processed under the same control thread name as the current wafer lot, and have also been measured for photolithography error using the review station 1317. When this information exists, the photolithography control input signal settings are retrieved from the data store 1360. These settings are then downloaded to the photolithography processing tool 1310.

The wafers 1305 are processed through the photolithography processing tool 1310. This includes, in the embodiment illustrated, photoresist deposition and/or patterning, as schematically illustrated in FIGS. 3–5 discussed above. The wafers 1305 are measured on the review station 1317 after their photolithography processing on the photolithography processing tool 1310. The review station 1317 examines the wafers 1305 after they are processed for a number of errors. The data generated by the instruments of the review station 1317 is passed to the machine interface 1430 via sensor interface 1415 and the line 1320. The review station script begins with a number of APC commands for the collection of data. The review station script then locks itself in place and activates a data available script. This script facilitates the actual transfer of the data from the review station 1317 to the APC framework. Once the transfer is completed, the script exits and unlocks the review station script. The interaction with the review station 1317 is then generally complete.

As will be appreciated by those skilled in the art having the benefit of this disclosure, the data generated by the review station 1317 should be preprocessed for use. Review stations, such as KLA review stations, provide the control algorithms for measuring the control error. Each of the error measurements, in this particular embodiment, corresponds to one of the photolithography control input signals on the line 1320 in a direct manner. Before the error can be utilized to correct the photolithography control input signal, a certain amount of preprocessing is generally completed.

For example, preprocessing may include outlier rejection. Outlier rejection is a gross error check ensuring that the received data is reasonable in light of the historical performance of the process. This procedure involves comparing each of the photolithography errors to its corresponding predetermined boundary parameter. In one embodiment, even if one of the predetermined boundaries is exceeded, the error data from the entire semiconductor wafer lot is generally rejected.

To determine the limits of the outlier rejection, thousands of actual semiconductor manufacturing fabrication ("fab") data points are collected. The standard deviation for each error parameter in this collection of data is then calculated. In one embodiment, for outlier rejection, nine times the standard deviation (both positive and negative) is generally chosen as the predetermined boundary. This was done primarily to ensure that only the points that are significantly outside the normal operating conditions of the process are rejected.

Preprocessing may also smooth the data, which is also known as filtering. Filtering is important because the error measurements are subject to a certain amount of randomness, such that the error significantly deviates in value. Filtering the review station data results in a more accurate assessment of the error in the photolithography control input signal settings. In one embodiment, the photolithography control scheme utilizes a filtering procedure known as an Exponentially-Weighted Moving Average ("EWMA") filter, although other filtering procedures can be utilized in this context.

One embodiment for the EWMA filter is represented by Equation (1):

$$AVG_N = W*M_c + (1-W)*AVG_p \quad (1)$$

where
 $AVG_N$=the new EWMA average;
 W=a weight for the new average ($AVG_N$);
 $M_c$ the current measurement; and
 $AVG_p$ the previous EWMA average.

The weight is an adjustable parameter that can be used to control the amount of filtering and is generally between zero and one. The weight represents the confidence in the accuracy of the current data point. If the measurement is considered accurate, the weight should be close to one. If there were a significant amount of fluctuations in the process, then a number closer to zero would be appropriate.

In one embodiment, there are at least two techniques for utilizing the EWMA filtering process. The first technique uses the previous average, the weight, and the current measurement as described above. Among the advantages of utilizing the first implementation are ease of use and minimal data storage. One of the disadvantages of utilizing the first implementation is that this method generally does not retain much process information. Furthermore, the previous average calculated in this manner would be made up of every data point that preceded it, which may be undesirable. The second technique retains only some of the data and calculates the average from the raw data each time.

The manufacturing environment in the semiconductor manufacturing fab presents some unique challenges. The order that the semiconductor wafer lots are processed through a photolithography processing tool may not correspond to the order in which they are read on the review station. This could lead to the data points being added to the EWMA average out of sequence. Semiconductor wafer lots may be analyzed more than once to verify the error measurements. With no data retention, both readings would contribute to the EWMA average, which may be an undesirable characteristic. Furthermore, some of the control threads may have low volume, which may cause the previous average to be outdated such that it may not be able to accurately represent the error in the photolithography control input signal settings.

The photolithography processing tool controller 1315, in this particular embodiment, uses limited storage of data to calculate the EWMA filtered error, i.e., the first technique. Wafer lot data, including the lot number, the time the lot was processed, and the multiple error estimates, are stored in the data store 1360 under the control thread name. When a new set of data is collected, the stack of data is retrieved from data store 1360 and analyzed. The lot number of the current lot being processed is compared to those in the stack. If the lot number matches any of the data present there, the error measurements are replaced. Otherwise, the data point is added to the current stack in chronological order, according to the time periods when the lots were processed. In one embodiment, any data point within the stack that is over 148 hours old is removed. Once the aforementioned steps are complete, the new filter average is calculated and stored to data store 1360.

Thus, the data is collected and preprocessed, and then processed to generate an estimate of the current errors in the photolithography control input signal settings. First, the data is passed to a compiled Matlab® plug-in that performs the outlier rejection criteria described above. The inputs to a plug-in interface are the multiple error measurements and an array containing boundary values. The return from the plug-in interface is a single toggle variable. A nonzero return denotes that it has failed the rejection criteria, otherwise the variable returns the default value of zero and the script continues to process.

After the outlier rejection is completed, the data is passed to the EWMA filtering procedure. The controller data for the control thread name associated with the lot is retrieved, and all of the relevant operation upon the stack of lot data is carried out. This includes replacing redundant data or removing older data. Once the data stack is adequately prepared, it is parsed into ascending time-ordered arrays that correspond to the error values. These arrays are fed into the EWMA plug-in along with an array of the parameter required for its execution. In one embodiment, the return from the plug-in is comprised of the six filtered error values.

Returning to FIG. 15, data preprocessing includes measuring a characteristic parameter in a photolithography operation, such as workpiece 1305 POE, arising from photolithography processing control of the photolithography processing tool 1310, as set forth in box 1520. Known, potential characteristic parameters may be identified by characteristic data patterns or may be identified as known consequences of modifications to critical dimension control. The example of how changes in POE affect yield given above falls into this latter category.

The next step in the control process is to calculate the new settings for the photolithography processing tool controller 1315 of the photolithography processing tool 1310. The previous settings for the control thread corresponding to the current wafer lot are retrieved from the data store 1360. This data is paired along with the current set of photolithography errors. The new settings are calculated by calling a compiled Matlab(D plug-in. This application incorporates a number of inputs, performs calculations in a separate execution component, and returns a number of outputs to the main script. Generally, the inputs of the Matlab® plug-in are the photolithography control input signal settings, the review station errors, an array of parameters that are necessary for the control algorithm, and a currently unused flag error. The outputs of the Matlab® plug-in are the new controller settings, calculated in the plug-in according to the controller algorithm described above.

A photolithography process engineer or a control engineer, who generally determines the actual form and extent of the control action, can set the parameters. They include the threshold values, maximum step sizes, controller weights, and target values. Once the new parameter settings are calculated, the script stores the setting in the data store 1360 such that the photolithography processing tool 1310 can retrieve them for the next wafer lot to be processed. The principles taught by the present invention can be implemented into other types of manufacturing frameworks.

Returning again to FIG. 15, the calculation of new settings includes, as set forth in box 1530, modeling the identified characteristic parameter. This modeling may be performed by the Matlab® plug-in. In this particular embodiment, only known, potential characteristic parameters are modeled and the models are stored in a database 1335 accessed by a machine interface 1430. The database 1335 may reside on the workstation 1330, as shown, or some other part of the APC framework. For instance, the models might be stored in the data store 1360 managed by the APC system manager 1440 in alternative embodiments. The model will generally be a mathematical model, i.e., an equation describing how the change(s) in photolithography recipe control(s) affects the photolithography performance and the semiconductor device yield, , and the like. As discussed above, the photolithography overlay error test (POET) measurements, represented generally by a vector $\epsilon$, may be put into a semiconductor device yield model, represented generally by a function $Y(\epsilon)$, which maps the POET measurements $\epsilon$ into a measure of the semiconductor device yield, represented generally by a scalar y, characteristic of the processing performed in at least one of the processing steps j 105, where j may have any value from j=1 to j=N−1, so that $Y(\epsilon)=y$. The semiconductor device yield model may be optimized by finding the maximum of $Y(\epsilon)=y$, with respect to variations in the POET measurements $\epsilon$.

For example, if $Y(\epsilon)=y=Y(|\epsilon|)=|\epsilon|^n \exp(-a|\epsilon|)$, then the condition $\partial Y(|\epsilon|)/\partial|\epsilon|=0=n|\epsilon|^{n-1}\exp(-\alpha|\epsilon|)-\alpha|\epsilon|^n\exp(-\alpha|\epsilon|)=(n-\alpha|\epsilon|)|\epsilon|^{n-1}\exp(-\alpha|\epsilon|)$ defines the extrema of $Y(\epsilon)=y=Y(|\epsilon|)=|\epsilon|^n\exp(-\alpha|\epsilon|)$. The further condition $\partial^2 Y(|\epsilon|)/\partial|\epsilon|^2=-\alpha|\epsilon|^{n-1}\exp(-\alpha|\epsilon|)<0$ at $n=\alpha|\epsilon|$ confirms that $n=\alpha|\epsilon|$ maximizes $Y(\epsilon)=y=Y(|\epsilon|)=|\epsilon|^n\exp(-\alpha|\epsilon|)$.

The particular model used will be implementation specific, depending upon the particular photolithography processing tool 1310 and the particular characteristic parameter being modeled. Whether the relationship in the model is linear or non-linear will be dependent on the particular parameters involved.

The new settings are then transmitted to and applied by the photolithography processing tool controller 1315. Thus, returning now to FIG. 15, once the identified characteristic parameter is modeled, the model is applied to modify at least one photolithography recipe control input parameter, as set forth in box 1540. In this particular embodiment, the machine interface 1430 retrieves the model from the database 1335, plugs in the respective value(s), and determines the necessary change(s) in the photolithography recipe control input parameter(s). The change is then communicated by the machine interface 1430 to the equipment interface 1410 over the line 1320. The equipment interface 1410 then implements the change.

The present embodiment furthermore provides that the models be updated. This includes, as set forth in boxes 1550–1560 of FIG. 15, monitoring at least one effect of modifying the photolithography recipe control input parameters (box 1550) and updating the applied model (box 1560) based on the effect(s) monitored. For instance, various aspects of the operation of the photolithography processing tool 1310 will change as the photolithography processing tool 1310 ages. By monitoring the effect of the photolithography recipe change(s) implemented as a result of the characteristic parameter (e.g., workpiece 1305 POE) measurement, the necessary value could be updated to yield superior performance.

As noted above, this particular embodiment implements an APC system. Thus, changes are implemented "between" lots. The actions set forth in the boxes 1520–1560 are implemented after the current lot is processed and before the second lot is processed, as set forth in box 1570 of FIG. 15. However, the invention is not so limited. Furthermore, as noted above, a lot may constitute any practicable number of wafers from one to several thousand (or practically any finite number). What constitutes a "lot" is implementation specific, and so the point of the fabrication process in which the updates occur will vary from implementation to implementation.

Any of the above-disclosed embodiments of a method of manufacturing according to the present invention enables the use of central values and spreads of parametric measurements sent from measuring tools and/or a wafer electrical test (WET) to make supervisory processing adjustments, either manually and/or automatically, to improve and/or better control the yield. Additionally, any of the above-disclosed embodiments of a method of manufacturing according to the present invention enables semiconductor device fabrication with increased device accuracy and precision, increased efficiency and increased device yield, enabling a streamlined and simplified process flow, thereby decreasing the complexity and lowering the costs of the manufacturing process and increasing throughput.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of manufacturing, the method comprising:
  processing a workpiece in a processing step;
  measuring a parameter characteristic of the processing performed on the workpiece in the processing step;
  forming an output signal corresponding to the characteristic parameter measured; and
  setting a target value for the processing performed in the processing step based on the output signal.

2. The method of claim 1, wherein measuring the characteristic parameter includes measuring a photolithography overlay error.

3. The method of claim 2, wherein forming the output signal corresponding to the characteristic parameter measured includes using the photolithography overlay error measured as an input to a semiconductor device yield model.

4. The method of claim 3, wherein setting the target value for the processing performed in the processing step based on the output signal includes using the semiconductor device yield model to define a change in the processing performed in the processing step needed to increase a semiconductor device yield value.

5. The method of claim 4, wherein using the semiconductor device yield model to define the change in the processing performed in the processing step includes defining a change in a photolithography overlay error target value needed to increase the semiconductor device yield value.

6. The method of claim 5, wherein defining the change in the photolithography overlay error target value includes setting the photolithography overlay error target value to maximize the semiconductor device yield value.

7. A method of manufacturing, the method comprising:
  processing a workpiece in a plurality of processing steps;
  measuring parameters characteristic of the processing performed on the workpiece in the plurality of processing steps before the workpiece has been completely processed;
  forming an output signal corresponding to the characteristic parameters measured; and
  setting target values for the processing performed in at least one of the plurality of processing steps based on the output signal.

8. The method of claim 7, wherein measuring the characteristic parameters includes measuring photolithography overlay errors.

9. The method of claim 8, wherein forming the output signal corresponding to the characteristic parameters measured includes using the photolithography overlay errors measured as inputs to a semiconductor device yield model.

10. The method of claim 9, wherein setting the target values for the processing performed in the at least one of the plurality of processing steps based on the output signal includes using the semiconductor device yield model to define a change in the processing performed in the at least one of the plurality of processing steps needed to increase a semiconductor device yield value.

11. The method of claim 10, wherein using the semiconductor device yield model to define the change in the processing performed in the at least one of the plurality of processing steps includes defining a change in a photolithography overlay error target value needed to increase the semiconductor device yield value.

12. The method of claim 11, wherein defining the change in the photolithography overlay error target value includes setting the photolithography overlay error target value to maximize the semiconductor device yield value.

13. A computer-readable, program storage device encoded with instructions that, when executed by a computer, perform a method comprising:
  processing a workpiece in a processing step;
  measuring a parameter characteristic of the processing performed on the workpiece in the processing step;

forming an output signal corresponding to the characteristic parameter measured; and setting a target value for the processing performed in the processing step based on the output signal.

14. The device of claim 13, wherein measuring the characteristic parameter includes measuring a photolithography overlay error.

15. The device of claim 14, wherein forming the output signal corresponding to the characteristic parameter measured includes using the photolithography overlay error measured as an input to a semiconductor device yield model.

16. The device of claim 15, wherein setting the target value for the processing performed in the processing step based on the output signal includes using the semiconductor device yield model to define a change in the processing performed in the processing step needed to increase a semiconductor device yield value.

17. The device of claim 16, wherein using the semiconductor device yield model to define the change in the processing performed in the processing step includes defining a change in a photolithography overlay error target value needed to increase the semiconductor device yield value.

18. The device of claim 17, wherein defining the change in the photolithography overlay error target value includes setting the photolithography overlay error target value to maximize the semiconductor device yield value.

19. A computer-readable, program storage device encoded with instructions that, when executed by a computer, perform a method comprising:

processing a workpiece in a plurality of processing steps;

measuring parameters characteristic of the processing performed on the workpiece in the plurality of processing steps before the workpiece has been completely processed;

forming an output signal corresponding to the characteristic parameters measured; and setting target values for the processing performed in at least one of the plurality of processing steps based on the output signal.

20. The device of claim 19, wherein measuring the characteristic parameters includes measuring photolithography overlay errors.

21. The device of claim 20, wherein forming the output signal corresponding to the characteristic parameters measured includes using the photolithography overlay errors measured as inputs to a semiconductor device yield model.

22. The device of claim 21, wherein setting the target values for the processing performed in the at least one of the plurality of processing steps based on the output signal includes using the semiconductor device yield model to define a change in the processing performed in the at least one of the plurality of processing steps needed to increase a semiconductor device yield value.

23. The device of claim 22, wherein using the semiconductor device yield model to define the change in the processing performed in the at least one of the plurality of processing steps includes defining a change in a photolithography overlay error target value needed to increase the semiconductor device yield value.

24. The device of claim 23, wherein defining the change in the photolithography overlay error target value includes setting the photolithography overlay error target value to maximize the semiconductor device yield value.

25. A computer programmed to perform a method comprising:

processing a workpiece in a processing step;

measuring a parameter characteristic of the processing performed on the workpiece in the processing step;

forming an output signal corresponding to the characteristic parameter measured; and setting a target value for the processing performed in the processing step based on the output signal.

26. The computer of claim 25, wherein measuring the characteristic parameter includes measuring a photolithography overlay error.

27. The computer of claim 26, wherein forming the output signal corresponding to the characteristic parameter measured includes using the photolithography overlay error measured as an input to a semiconductor device yield model.

28. The computer of claim 27, wherein setting the target value for the processing performed in the processing step based on the output signal includes using the semiconductor device yield model to define a change in the processing performed in the processing step needed to increase a semiconductor device yield value.

29. The computer of claim 28, wherein using the semiconductor device yield model to define the change in the processing performed in the processing step includes defining a change in a photolithography overlay error target value needed to increase the semiconductor device yield value.

30. The computer of claim 29, wherein defining the change in the photolithography overlay error target value includes setting the photolithography overlay error target value to maximize the semiconductor device yield value.

31. A computer programmed to perform a method comprising:

processing a workpiece in a plurality of processing steps;

measuring parameters characteristic of the processing performed on the workpiece in the plurality of processing steps before the workpiece has been completely processed;

forming an output signal corresponding to the characteristic parameters measured; and setting target values for the processing performed in at least one of the plurality of processing steps based on the output signal.

32. The computer of claim 31, wherein measuring the characteristic parameters includes measuring photolithography overlay errors.

33. The computer of claim 32, wherein forming the output signal corresponding to the characteristic parameters measured includes using the photolithography overlay errors measured as inputs to a semiconductor device yield model.

34. The computer of claim 33, wherein setting the target values for the processing performed in the at least one of the plurality of processing steps based on the output signal includes using the semiconductor device yield model to define a change in the processing performed in the at least one of the plurality of processing steps needed to increase a semiconductor device yield value.

35. The computer of claim 34, wherein using the semiconductor device yield model to define the change in the processing performed in the at least one of the plurality of processing steps includes defining a change in a photolithography overlay error target value needed to increase the semiconductor device yield value.

36. The computer of claim 35, wherein defining the change in the photolithography overlay error target value includes setting the photolithography overlay error target value to maximize the semiconductor device yield value.

37. A method of manufacturing, comprising:

processing a workpiece in a photolithography step;

measuring a photolithography overlay error of the workpiece;

providing the photolithography overlay error to a semiconductor device model;

forming an output signal using the semiconductor device model and the photolithography overlay error; and setting a target value for the photolithography step performed in the processing step based on the output signal.

38. The method of claim 37, wherein setting the target value for the photolithography step based on the output signal comprises using a semiconductor device yield model to define a change in the processing performed in the photolithography step needed to increase a semiconductor device yield value.

39. The method of claim 38, wherein using the semiconductor device yield model to define the change in the processing performed in the photolithography step comprises defining a change in a photolithography overlay error target value needed to increase the semiconductor device yield value.

40. The method of claim 39, wherein defining the change in the photolithography overlay error target value comprises setting the photolithography overlay error target value to maximize the semiconductor device yield value.

41. A method of manufacturing, comprising:

forming a plurality of features in a layer of photoresist using at least one input parameter;

measuring a photolithography overlay error characteristic of the plurality of features;

providing the photolithography overlay error to a semiconductor device model;

forming an output signal using the semiconductor device model and the photolithography overlay error; and determining a value of the at least one input parameter needed to increase a semiconductor device yield value based on the output signal.

42. The method of claim 41, wherein determining the value of the at least one input parameter needed to increase the semiconductor device yield value comprises determining a value of the at least one input parameter needed to maximize the semiconductor device yield value.

43. The method of claim 41, further comprising forming a plurality of features in a subsequent layer of photoresist using a determined value of the at least one input parameter.

44. The method of claim 41, wherein forming the plurality of features in the layer of photoresist using at least one input parameter comprises forming the plurality of features in the layer of photoresist using at least one of a threshold value, a maximum step size, a controller weight, and a target value.

45. The method of claim 41, further comprising updating the semiconductor device model based on the output signal.

46. The method of claim 41, further comprising setting a target value for the photolithography overlay error based on the output signal.

47. An apparatus, comprising:

a photolithography tool for forming a plurality of features on a workpiece;

a reviewing station for measuring a photolithography overlay error characteristic of the plurality of features; and a process controller capable of:

forming an output signal using a semiconductor device model and the photolithography overlay error; and setting a target value for a photolithography step performed in a processing step based on the output signal.

48. The apparatus of claim 47, wherein the process controller is capable of using a semiconductor device yield model to define a change in the processing performed in the photolithography step needed to increase a semiconductor device yield value.

49. The apparatus of claim 48, wherein the process controller is capable of defining a change in a photolithography overlay error target value needed to increase the semiconductor device yield value.

50. The apparatus of claim 49, wherein the process controller is capable of setting the photolithography overlay error target value to maximize the semiconductor device yield value.

51. The apparatus of claim 47, wherein the photolithography tool forms the plurality of features on a workpiece using at least one input parameter.

52. The apparatus of claim 51, wherein the process controller is capable of determining a value of the at least one input parameter needed to increase a semiconductor device yield value based on the output signal.

53. The apparatus of claim 52, wherein the photolithography tool is capable of forming a plurality of features in a subsequent workpiece using the determined value of the at least one input parameter.

54. The apparatus of claim 47, wherein the process controller is capable of updating the semiconductor device model based on the output signal.

* * * * *